United States Patent Office 2,721,884
Patented Oct. 25, 1955

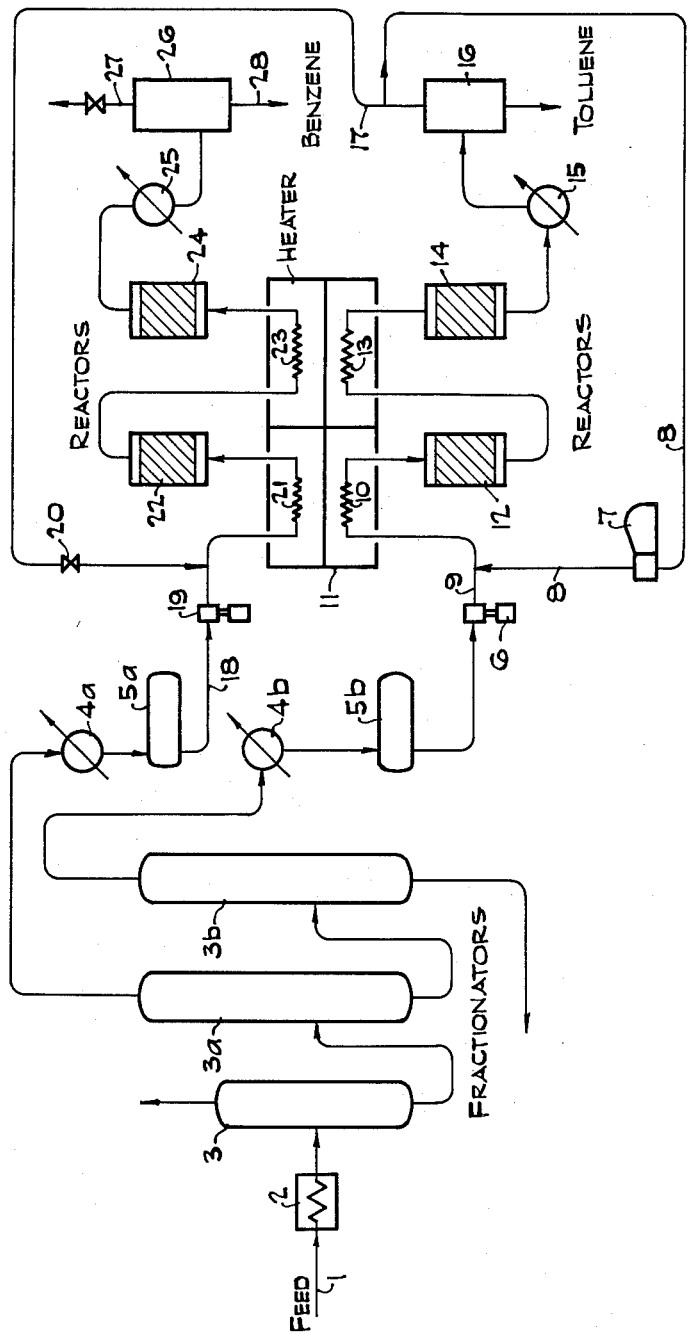

2,721,884

PRODUCTION OF AROMATIC HYDROCARBONS

Wilhelmus Marinus Johannes Ruedisulj, The Hague, Netherlands, assignor to Shell Development Company, Emeryville, Calif., a corporation of Delaware Application February 2, 1952, Serial No. 269,619

Claims priority, application Netherlands July 31, 1951

5 Claims. (Cl. 260—668)

This invention relates to an improved process for the production of aromatic hydrocarbons from naphthenic petroleum distillates. The invention relates especially to the production of benzene, toluene, and, if desired, also xylenes from naphthenic petroleum fractions by catalytic treatment in the presence of hydrogen.

Processes are already known for the production of aromatic hydrocarbons including benzene, toluene, and xylene from distillate fractions of naphthenic petroleums by catalytic treatment in the presence of hydrogen. The known processes are divided into two distinct groups.

One group, typified by hydroforming, consists of the processes in which the naphthenic feed material is treated under severe conditions during a short process period, after which the catalyst is regenerated by removing carbonaceous deposits. The duration of the process period is generally about six hours but may be at the most about half a week. The catalyst is generally a molybdenum oxide or chromium oxide catalyst which is rugged and able to withstand the frequent regenerations. The plant is constructed so that the regeneration may be carried out with the catalyst in place. This type of process is relatively efficient but is too costly for practical application except under abnormal circumstances such as existed during the late war.

The second group comprises those processes in which the conversion is carried out continuously without catalyst regeneration for at least a month and generally at least three months. The catalyst employed in these processes is generally a sulfide catalyst such, for example, as tungsten sulfide-nickel sulfide. In this type of process, the regeneration of the catalyst is much more difficult and generally cannot be carried out with the catalyst in situ. The process of this type has two main drawbacks which are: (1) under the relatively mild conditions used and with the catalyst generally used, the conversion of potential aromatic-forming hydrocarbon to aromatics is poor, unless the process is employed in conjunction with a separate process for converting $C_5$-ring cycloalkanes to $C_6$-ring cycloalkanes in the feed and, (2) in order to maintain the substantially continuous operation, it is essential that a large amount of hydrogen be recycled; the cost of recycling the required large amount of hydrogen is one of the major costs in the process.

The latter type of process was used extensively during the late war to produce substantially pure toluene suitable for nitration. By changing the fractionation system to separate a $C_6$–$C_7$ fraction, instead of a $C_6$ fraction, benzene can also be produced in this manner; however, this arrangement is not efficient or practical since the conversion to benzene is poor under the normal conditions and if the conditions are altered to provide a more efficient conversion to benzene, the catalyst becomes quickly fouled and the continuous operation is not possible.

It has now been found that benzene may be produced simultaneously with toluene and, if desired, also with xylene by a combination process which takes advantage of the natural distribution of aromatic progenitors in naphthenic petroleums and the different thermodynamic factors involved in the production of benzene and toluene. By operating the process in the manner to be described, both benzene and its higher homologues can be produced at maximum efficiency while, at the same time, decreasing the costly gas recirculation requirements.

The process of the invention, briefly stated consists of the combination of steps comprising separating a $C_6$ fraction containing cycloalkanes and a separate higher boiling fraction containing $C_7$ cycloalkanes, contacting the latter fraction in the vapor phase at a temperature between 450° C. and 525° C. in the presence of recycled hydrogen under a pressure between 20 and 80 atmospheres with a platinum catalyst, cooling the product and separating the condensed liquid from the gas containing hydrogen, recycling a part of the gas to the said treatment, and contacting the remainder of the gas fraction with the $C_6$ fraction in the vapor phase at a temperature between 450° C. and 525° C. with a platinum catalyst at a pressure below the above mentioned pressure and between 10 and 35 atmospheres, cooling the product from the latter treatment, and separating substantially pure benzene from the resulting condensed liquid product. The production of benzene and benzene homologues can be carried out advantageously by subjecting individually to appropriate catalytic treatment a hydrocarbon fraction containing $C_6$ cycloalkanes which has a boiling range closely approaching the boiling limits of the $C_6$ cycloalkanes, and subjecting a separate hydrocarbon fraction containing the higher homologues of the $C_6$ cycloalkanes to an appropriate catalytic treatment under a higher pressure which is sufficiently high that the end gases obtained after cooling the reaction mixture are still under a sufficient pressure to enable them to be used directly for the treatment of the $C_6$ cycloalkane fraction. For the purpose of defining the present invention, a $C_6$ fraction of naphthenic petroleum is a fraction separated by efficient fractional distillation to include substantially all of the benzene progenitors and to exclude substantially all of the $C_5$ and $C_7$ hydrocarbons. A typical fraction is one obtained by fractionating a naphthenic gasoline in a fractionating column having the equivalent of 30 theoretical plates and having an ASTM boiling range of 69 to 85° C. A $C_7$ fraction of naphthenic petroleum is a fraction separated by efficient fractional distillation to include substantially all of the toluene progenitors and to exclude substantially all $C_6$ and $C_8$ hydrocarbons. A typical fraction is one obtained by fractionating a naphthenic gasoline in a distillation column having the equivalent of 30 theoretical plates and having an A. S. T. M. boiling range of from 85° to 113° C. In preparing the $C_6$ fractions, the exclusion of material boiling above the desired range is more important than the exclusion of material boiling below the desired range.

The process of the invention will be described in more detail in conjunction with the flow diagram shown in the accompanying drawing. Various features of the process will then be further explained in subsequent paragraphs.

Referring to the drawing, a naphtha derived from a naphthenic petroleum and containing $C_6$–$C_7$ cycloalkanes is introduced by line 1, heated in furnace 2, and passed to the first fractionation column indicated diagrammatically at 3. Fractionation column 3, which contains the equivalent of at least 15 theoretical plates, is controlled to separate the hydrocarbons boiling below the $C_6$ range as an overhead product. This overhead product may be returned to the refinery for any desired utilization. The bottom product from fractionation column 3 is passed to a second fractionation column 3a. Fractionation column 3a, having the equivalent of 30 or more theoretical plates, is controlled to separate as an overhead the desired C₆ fraction containing the C₆ cycloalkanes. In a typical case, the overhead product of fractionation 3a boils between 69° and 85° C. and has the following composition:

| | Percent |
|---|---|
| Paraffines | 32 |
| Methylcyclopentane | 42 |
| Cyclohexane | 23 |
| Benzene | 3 |

The bottom product from fractionation column 3a is passed to a third fractionation column 3b which likewise has the equivalent of 30 or more theoretical plates. Fractionation column 3b is controlled to separate a C₇ fraction as the overhead product. In a typical case, this overhead product boils between 85° and 113° C. and has the following composition:

| | Percent |
|---|---|
| Paraffins | 33 |
| Dimethylcyclopentanes | 45 |
| Methylcyclohexane | 14 |
| Toluene | 8 |

The overhead product from fractionation columns 3a and 3b are cooled in coolers 4a and 4b, respectively, and the condensed fractions are passed to surge tanks 5a and 5b, respectively.

In a typical case, the volume of the C₆ fraction is 2,420 barrels/day and that of the C₇ fraction is 8,580 barrels/day. The bottoms from fractionation column 3b may be returned to the refinery for any desired utilization.

The C₇ fraction is withdrawn from the surge tank 5b at a desired rate and raised to a conversion pressure between 20 and 80 atmospheres, e. g., 35 atmospheres, by pump 6. Product gas consisting substantially of hydrogen is recycled by compressor 7 and line 8 and commingled with the C₇ fraction in line 9. The amount of this recycled gas may vary but is generally between about 2 and 10 moles per mole of the hydrocarbon feed. The mixture is then passed through coil 10 of one cell of the multicell heating furnace 11 wherein it is heated up to the initial reaction temperature of 450°–525° C., preferably 475°–500° C. The preheated reaction mixture is then passed to the catalytic reactor 12 wherein it is contacted with a suitable isomerization-dehydrogenation catalyst, e. g., platinum or rhodium supported upon an acid carrier. One suitable catalyst is prepared by impregnating an adsorptive alumina with chloroplatinic acid to incorporate 0.05–1.0% platinum and then, after reducing the platinum to the metal, treating the composite with hydrogen fluoride to incorporate 0.2 to 2% fluorine.

When using the specified isomerization-dehydrogenation catalyst, the conversion is highly endothermic and, consequently, when using a so-called adiabatic reactor, there is a substantial temperature drop in the reactor and complete conversion is not generally attained. The partially converted reaction mixture issuing from reactor 12 is therefore preferably passed through coil 13 in another cell of the furnace in order to bring it back to the desired reaction temperature and the reheated mixture is then passed through a second catalytic converter 14 wherein the conversion is brought nearer to completion. In practice, a series of 2, 3 or 4 such converters with intermediate heating may be applied but, for the sake of simplicity, only two such converters are shown.

The reaction mixture issuing from the last catalytic converter is cooled in cooler 15 and passed to a separator 16. The condensed liquid product is withdrawn by line 17. This product is a toluene fraction from which pure toluene can be easily recovered by known methods such, for instance, as extractive distillation. The uncondensed portion of the mixture consists substantially of hydrogen. It comprises the hydrogen gas recycled by line 8, augmented by the substantial amount of hydrogen produced in the conversion. A part of this gas is withdrawn by line 8 and recycled as explained, and the remainder is removed by line 17. Since the pressure in the separator 16 is substantailly at the mentioned conversion pressure, and since this pressure is high, the cost of compressing the gas for the necessary recycling is low. This is true because at the high pressure only a low compression ratio is necessary to compensate for the pressure drop through the system, and consequently, only a small compression energy is required.

The C₆ fraction withdrawn by line 18 from surge tank 5a is pumped by pump 19 up to the conversion pressure. This pressure is in all cases appreciably below the pressure used in the conversion of the C₇ fraction. The pressure may vary from about 10 atmospheres to about 35 atmospheres but is preferably between 10 and about 15 atmospheres. The hydrogen gas withdrawn by line 17 from the high pressure separator 16 is expanded through valve 20 and fed to line 18. The resulting mixture is then preheated to a temperature of 450°–525° C., preferably 475°–500° C., in coil 21 of the furnace and passed to the catalytic converter 22 which is likewise provided with the necessary isomerization-dehydrogenation catalyst. The partially converted reaction mixture issuing from reactor 22 is reheated in coil 23 and passed through a second converter 24. The resulting reaction mixture is then cooled in cooler 25 and passed to a separator 26. The condensed liquid product withdrawn by line 28 is a concentrate of benzene from which pure benzene can be easily recovered by known methods such, for instance, as extractive distillation. The uncondensed gases are withdrawn by line 27.

The process of the invention illustrated above, takes advantage of the combination of two things which will now be explained.

The first of these is the fact that it is impossible to efficiently convert the benzene progenitors simultaneously with the toluene and/or xylene progenitors under a given set of practical working conditions. This is due to a combination of thermodynamic and practical considerations. Thus, in order to obtain sustained conversion of the higher boiling C₇ and/or C₈ fraction, it is essential that a high hydrogen pressure, e. g., 35 atmospheres, be applied. Under these conditions, a conversion of methylcyclohexane to toluene of for example about 90%, can be obtained at a temperature of e. g., 450° C. Under these conditions, however, the conversion of the benzene progenitors is thermodynamically unfavorable so that only a poor conversion (about 25%) can be obtained. In order to obtain a 90% conversion of cyclohexane to benzene a considerably higher temperature (nearly 550° C.) would be necessary. The use of a higher temperature is possible when treating the C₆ fraction alone, but if the higher boiling C₇–C₈ fraction is present, fouling of the catalyst again becomes a problem. In the process of the invention this difficulty is overcome without increasing the temperature by effecting the conversion of the C₇ and/or C₈ fraction at a high pressure and effecting the conversion of the C₆ fraction at a low pressure where the conversion to benzenes is favored and an efficient conversion can be obtained at the temperatures specified.

In combination with the above, the process of the invention takes advantage of the natural distribution of aromatic progenitors in the naphthenic petroleums. The progenitors of benzene are methylcyclopentane and cyclohexane, referred to herein as C₆ cycloalkanes. The progenitors of toluene are the dimethylcyclopentanes and methylcyclohexane, herein referred to as C₇ cycloalkanes. The progenitors of xylenes are the trimethylcyclopentanes, the methylethylcyclopentanes, the dimethylcyclohexanes, and ethylcyclohexane, herein referred to as C₈ cycloalkanes. Experience has shown that in the C₆, C₇ and C₈ fractions of naphthenic petroleums, the progenitors having five membered rings (alkyl cyclopentanes) make up a substantial part of the total. Experience has also shown that when a naphthenic petroleum is fractionated as described to separate a $C_6$ fraction and a $C_7$ fraction, the $C_7$ fraction is much larger than the $C_6$ fraction.

Experience has shown repeatedly that in order to obtain conversion of the benzene progenitors to benzene in a $C_6$ fraction such as described, it is essential that the conversion be carried out at a relatively high temperature, as indicated, and that in order to obtain sustained conversion under these conditions it is essential that the conversion be carried out in the presence of a substantial amount of hydrogen. Thus, the amount of hydrogen in the mixture feed to the reactor 22 should contain at least about 4 moles of hydrogen per mole of hydrocarbon. This required hydrogen is ordinarily obtained by recycling the product gas. This is, however, costly, particularly if the working pressure is low.

As a consequence of the above conditions, it turns out that if the toluene progenitors are efficiently converted to toluene, the hydrogen gas produced is sufficient to supply the requirements for the conversion of the $C_6$ fraction. In order to obtain the necessary hydrogen, however, it is essential that the $C_5$ ring toluene progenitors be effectively converted as well as the $C_6$ ring progenitors. This requires the use of a catalyst having isomerizing activity as well as hydrogenation activity. This will be clear from the following example:

In a typical case, a naphthenic petroleum is fractionated to separate a $C_6$ fraction and a separate $C_7$ fraction. The quantities and amounts of these fractions are given in the following table:

$C_6$ Fraction:
  Boiling range_____° C__ 69–85
  Amount _____B./D__ 2440
  $C_6$ ring progenitors_____percent__ 21.9
  $C_5$ ring progenitors_____do____ 42.6
$C_7$ Fraction:
  Boiling range_____° C__ 85–113
  Amount _____B./D__ 9760
  $C_6$ ring progenitors_____percent__ 14
  $C_5$ ring progenitors_____do____ 46

If the $C_7$ fraction is treated with a conventional hydroforming catalyst such as molybdenum-oxide-alumina, the $C_6$ ring naphthenes are effectively converted to toluene but the $C_5$-ring naphthenes are only converted to a minor extent. Assuming 100% conversion of the $C_6$ ring naphthenes and 25% conversion of the $C_5$-ring naphthalenes and disregarding the losses of hydrogen by solution in the liquid product and consumed in side reactions in the process, the total amount of hydrogen which is produced is about 20,390 pound moles per day. This amount of hydrogen would amount to only about 2.74 moles of hydrogen per mole of the $C_6$ fraction which is not sufficient for the conversion of this fraction without serious trouble due to fouling of the catalyst. On the other hand, if a catalyst having isomerization activity as well as dehydrogenation activity is applied, the $C_5$-ring naphthenes can also be effectively converted. The total amount of hydrogen in this case is about 47,700 pound moles per day which is equivalent to about 6.40 moles per mole of the $C_6$ fraction, or over twice the former ratio.

Thus, by separating the fractions as described and converting the $C_6$ fraction at a low pressure with a catalyst having both isomerization and dehydrogenation properties, an efficient conversion of the benzene progenitors to benzene can be obtained; at the same time by converting the $C_7$ fraction at a higher pressure with a catalyst having both isomerization and dehydrogenation properties, an efficient conversion to toluene can be obtained while at the same time producing an amount of hydrogen gas under sufficient pressure that it can supply the needs for the lower pressure conversion of the smaller $C_6$ fraction. It will be apparent that in order to make this result possible, it is essential that the larger $C_7$ fraction be converted with a catalyst having both isomerization and dehydrogenation properties at a relatively high pressure and that the smaller $C_6$ fraction be converted under a lower pressure.

Suitable catalysts having the necessary isomerization and dehydrogenation activity are those in which a platinum metal is incorporated, e. g., between about 0.05% and 1%, on the surface of an acid carrier. The preferred acid carriers for the platinum metal are the microporous solid acidic cracking catalysts known as the clay-type cracking catalysts. Suitable catalysts of this type are disclosed in U. S. Patents Numbers 2,478,916 and 2,479,109.

While the process of the invention has been described for the production of benzene and toluene only, it is also applicable for the production of xylenes and this, in fact, is an advantageous operation. It is found that, under the conditions of temperature and pressure specified for the conversion of the $C_7$ fraction, the xylene progenitors can be simultaneously converted efficiently without causing any difficulties due to fouling of the catalyst. Since the xylenes are easily separated from the toluene in the product, the process may be operated to produce substantial yields of desirable xylenes, along with the production of benzene and toluene. Also since the production of xylenes results in the production of additional amounts of hydrogen, it allows the ratio of hydrogen to hydrocarbon in the conversion of the $C_6$ fraction to be increased. When operating to produce xylenes, a separate $C_8$ fraction may be separated and this fraction may be separately processed in a parallel high pressure system, but it is generally more economical to simply treat the $C_7$ and $C_8$ fractions together. Thus, the fractionating column 3b may be controlled to separate as an overhead product a $C_7$–$C_8$ fraction instead of the described $C_7$ fraction. The $C_8$ portion of such a fraction in a typical case has a boiling range of 113°–138° C. and contains 37% naphthenes and 7% xylenes.

I claim as my invention:

1. Process for the production of benzene and higher aromatic hydrocarbons from naphthenic petroleum which comprises separating from naphthenic petroleum by fractionation a $C_6$ fraction containing $C_6$ cycloalkanes and a separate higher boiling fraction containing $C_7$ cycloalkanes, contacting the latter fraction in the vapor phase at a temperature between 450° and 525° C. in the presence of recycled hydrogen under a pressure between 20 and 80 atmospheres with a platinum catalyst having isomerization activity, cooling the product and separating the condensed liquid from a gas fraction containing hydrogen, recycling a part of said gas fraction to said treatment and contacting the remainder of said gas fraction with the said $C_6$ fraction in the vapor phase at a temperature between 450° C. and 525° C. with a platinum isomerization catalyst at a pressure below the above-mentioned pressure and between 10 and 35 atmospheres, whereby all of the hydrogen required in said operation at the lower pressure is supplied from hydrogen produced in said operation at the higher pressure, cooling the product from said latter treatment and separating substantially pure benzene from the condensed liquid product.

2. Process according to claim 1 further characterized in that said higher boiling fraction has a boiling range of from about 85° C. to 113° C. and that substantially pure toluene is recovered from the first said condensed liquid product.

3. Process for the production of benzene and higher aromatic hydrocarbons from naphthenic petroleum which comprises separating from naphthenic petroleum by fractionation a $C_6$ fraction containing $C_6$ cycloalkanes and a separate higher boiling $C_7$–$C_8$ fraction containing $C_7$ and $C_8$ cycloalkanes, contacting the latter fraction in the vapor phase at a temperature between 450° and 525°

C. in the presence of recycled hydrogen under a pressure between 20 and 80 atmospheres with a platinum catalyst having isomerization activity, cooling the product and separating the condensed liquid from a gas fraction containing hydrogen, recycling a part of said gas fraction to said treatment, contacting the remainder of said gas fraction with the said $C_6$ fraction in the vapor phase at a temperature between 450° C. and 525° C., with a platinum isomerization catalyst at a pressure below the above mentioned pressure and between 10 and 35 atmospheres, whereby the hydrogen required in the operation at the lower pressure is supplied from hydrogen produced in said operation at the higher pressure, cooling the product from said latter treatment and separating substantially pure benzene from the condensed liquid product.

4. Process according to claim 1 further characterized in that the said $C_6$ fraction has a boiling range of about 69° C. to 85° C. and said higher boiling fraction has a boiling range from about 85° C. to 113° C.

5. Process for the production of benzene and toluene from a naphthenic petroleum which comprises separating from a naphthenic petroleum by fractional distillation a $C_6$ fraction and a $C_7$ fraction, treating said fractions separately in separate reaction zones in the vapor phase with separate portions of an isomerizing platinum catalyst at a temperature between 450° C. and 525° C. in the presence of added hydrogen whereby naphthenes in each fraction are converted to the corresponding aromatic hydrocarbons, maintaining the reaction zone in which the $C_7$ fraction is treated at a high pressure between 20 and 80 atmospheres, maintaining the reaction zone in which the $C_6$ fraction is treated at a lower pressure between 10 and 35 atmospheres, recycling product gas from the treatment of the $C_7$ fraction at the said high pressure through the reaction zone with the $C_7$ fraction, expanding product gas consisting largely of hydrogen from said high pressure to said lower pressure and passing the expanded gas with the $C_6$ fraction through the reaction zone at said lower pressure, whereby the hydrogen required in said operation at the lower pressure is supplied by the hydrogen produced in said operation at the higher pressure.

References Cited in the file of this patent

UNITED STATES PATENTS

| | | |
|---|---|---|
| 2,324,165 | Layng et al. | July 13, 1943 |
| 2,375,573 | Meier | May 8, 1945 |
| 2,404,902 | Claussen et al. | July 30, 1946 |
| 2,550,531 | Ciapetta | Apr. 14, 1951 |

FOREIGN PATENTS

| | | |
|---|---|---|
| 585,958 | Great Britain | Mar. 3, 1947 |

OTHER REFERENCES

Haensel: Oil and Gas Jour. (Aug. 9, 1951), pages 80, 82 and 84.

Williams et al.: Oil and Gas Jour. (Aug. 9, 1951), pages 84, 88 and 101.